(12) United States Patent
Kestel (10) Patent No.: US 7,040,980 B1
(45) Date of Patent: May 9, 2006

(54) COMBINE HARVESTER HAVING DOUBLE UNLOADING AUGER SYSTEM

(76) Inventor: Frederick J. Kestel, 1829 W. 9000 N. Rd., Manteno, IL (US) 60950

( * ) Notice: Subject to any disclaimer, the term of this patent is extended or adjusted under 35 U.S.C. 154(b) by 0 days.

(21) Appl. No.: 11/021,052

(22) Filed: Dec. 27, 2004

(51) Int. Cl.
*A01D 17/02* (2006.01)
*A01F 12/46* (2006.01)

(52) U.S. Cl. .................. 460/114; 414/345; 414/502
(58) Field of Classification Search ............ 414/140.5, 414/140.7, 345, 526, 502; 198/317, 312, 198/601; 460/114
See application file for complete search history.

(56) References Cited

U.S. PATENT DOCUMENTS

| | | | | |
|---|---|---|---|---|
| 3,159,289 A | * | 12/1964 | Tweedale | 414/502 |
| 3,589,111 A | * | 6/1971 | Gullickson et al. | 56/12.8 |
| 3,825,138 A | * | 7/1974 | Pool | 414/505 |
| 3,874,530 A | * | 4/1975 | Purdy | 414/526 |
| 4,236,530 A | * | 12/1980 | Johnson | 460/65 |
| 4,274,790 A | * | 6/1981 | Barker | 414/502 |
| 4,284,369 A | * | 8/1981 | Gsponer et al. | 406/52 |
| 4,432,499 A | * | 2/1984 | Henkensiefken et al. | 241/30 |
| 5,443,352 A | * | 8/1995 | Schuhmacher | 414/526 |
| 5,584,640 A | * | 12/1996 | Johnson | 414/502 |
| 6,058,688 A | * | 5/2000 | Krambeck et al. | 56/14.5 |
| 6,113,339 A | * | 9/2000 | Adams | 414/505 |
| 6,712,691 B1 | * | 3/2004 | McLeod | 460/12 |
| 2004/0067125 A1 | * | 4/2004 | Dillon | 414/502 |

* cited by examiner

*Primary Examiner*—Árpád Fábián Kovács
(74) *Attorney, Agent, or Firm*—Davis Chin (57) ABSTRACT

A combine harvester for harvesting grain and seed crops includes a double unloading auger system for unloading in both directions of travel harvested feed grains produced in one round or two lengths of a field to storage area of transport vehicle. The double unloading auger system has a first main unloading auger assembly being selectively operable for discharging the harvested grain from a first side of the combine harvester to the transport vehicle and a second main unloading auger assembly being selectively operable for discharging the harvested grain from a second side of the combine harvester to the transport vehicle. A pair of transverse auger is located in a bottom wall of the grain tank and is selectively reversibly driven for delivery of the harvested grain from the grain tank to either the first main unloading auger assembly or the second main unloading auger assembly. As a result, if one unloading auger system is inoperative the combine can be continued operating at a reduced capacity until the inoperative auger system is repaired.

19 Claims, 5 Drawing Sheets

COMBINE HARVESTER HAVING DOUBLE UNLOADING AUGER SYSTEM

BACKGROUND OF THE INVENTION

1. Field of the Invention

This invention relates generally to apparatuses for harvesting of grain and seed crops and more particularly, the present invention relates to an improved combine harvester for harvesting grain and seed crops which includes a double unloading auger system for unloading in both directions of travel harvested feed grains produced in one round or two lengths of a field to storage area of transport vehicle.

2. Description of the Prior Art

As is generally known, modern combine harvesters for harvesting grain and seed crops such as corn, wheat, soybeans and the like and corn pickers have over the past many years increased significantly their throughput capacity. Simultaneously, the number of acres in the average farm in the United States has grown dramatically with the crop fields becoming larger and longer. It is not uncommon to have fields with each row therein measuring one-half mile in length. As a result, the amount of harvested crop produced in one round or two lengths during the back-and-forth harvesting of the field has also increased significantly.

In the conventional combine harvesters, the harvested grain is stored in an on-board grain bin or tank until the end of the field is reached. Then, the grain is removed from the grain tank by a main unloading auger positioned within an unloading chute disposed on one side of the combine harvester. This unloading chute permits the grain to be transferred into a bulk transport vehicle such as a truck or wagon, which is positioned on the one side of the combine harvester where the exit port of the unloading chute is located. Thus, these conventional combine harvesters suffer from the disadvantage that it must be unloaded from this one side only.

During the back-and-forth harvesting, at one end of the field the transport vehicle will not be able to receive grain from the combine harvester since the unloading chute will be on the other side of the combine harvester. This may necessitate that the transport vehicle be driven through the unharvested crop so that it will on the same side where the unloading chute of the combine harvester is located, thereby causing undesirable damage or destruction to the crop.

Further, due to the combine harvester having increased throughput coupled with the longer length fields, it has been found that the on-board storage tank has insufficient capacity to store the grain harvested during one round of the field having a length of one-half mile. Therefore, when the storage tank is full the combine harvester must be stopped and emptying the grain into a waiting truck. Alternatively, in order to increase efficiency the combine harvester may unload grain into a moving truck as both are moving in one direction while the combine harvester is continuously harvesting the grain. However, these techniques of unloading the grain has the same disadvantage in that it can be only accomplished for one length of the field again without requiring the truck to be driven through a swath of unharvested crop.

Accordingly, it would be desirable to provide an improved combine harvester for unloading of grain in both direction of travel of the field into a transport vehicle while the combine is continuously harvesting the grain. It would also be expedient that the combine harvester include a double unloading auger system which is relatively simply and inexpensive in design, construction and operation.

A prior art search directed to the subject matter of this application in the U.S. Patent and Trademark Office revealed the following Letters Patent and application:

3,589,111
3,825,138
4,236,530
4,274,790
4,432,499
5,584,640
6,058,688
6,712,691

In addition to the above listed prior art patents, there were also found Patent Application Nos. 2003/0022706 dated Jan. 30, 2003 and 2004/0067125 dated Apr. 8, 2004.

In U.S. Pat. No. 3,825,138 to Pool issued on Jul. 23, 1974, there is disclosed an unloader for a grain bin of a combine which includes a pair of transverse augers for feeding grain to a vertical auger. A swinging boom assembly is mounted on top of the vertical auger and includes a turret and a horizontal pipe having an auger located therein. The boom assembly communicates with a vertical pipe containing the vertical auger so as to receive grain therefrom and deliver it to a wagon or truck.

In U.S. Pat. No. 4,236,530 to Johnson issued on Dec. 2, 1980, there is taught a grain harvester and thrashing machine which includes first and second horizontal augers located in the bottom of a bin. The first horizontal auger discharges into a downwardly directed chute which feeds downwardly into a main vertical auger tube. The second horizontal auger feed directly into the main vertical auger tube. A vertical auger is located within the main vertical auger tube and discharges into a main horizontal discharge auger tube having an auger. The auger will move the grain for ultimate discharge into a vehicle passing next to the thrashing machine. The horizontal discharge auger tube is pivotally attached to the vertical auger tube so as to allow it to be swung at right angles with respect to the machine for unloading into a truck.

In U.S. Pat. No. 4,432,499 to Henkensiefken et al. issued on Feb. 21, 1984, there is taught a portable feed grinder-mixer which includes a pair of cooperating parallel, first and second horizontal auger conveyors extending across the bottom of a mixing bin in a side-by-side relationship for moving material in opposite directions. The second auger is driven by a hydraulic reversible orbit motor which receives its hydraulic fluid under pressure from a pump. A pair of vertical augers are spaced axially and cooperate with the respective first and second horizontal augers. A lift conveyor is connected to a swingably mounted distribution conveyor having an auger disposed therein. This auger is driven by a second hydraulic motor for carrying the material outwardly to its discharge end portion.

U.S. Pat. No. 5,584,640 issued on Dec. 17, 1996 to Johnson discloses a grain combine having an unloading auger drive system which includes two hydraulically operated devices in which the load on one of the devices is a function of the rate of operation of the other device. In particular, a traverse auger conveyor delivers grain from the lower part of a grain tank to an upright auger conveyor. The transverse auger conveyor is driven by a first hydraulic motor, and the upright auger conveyor is driven by a second hydraulic motor. A pressure responsive valve is responsive to a pressure signal which corresponds to the load on the second motor driving the upright auger so as to unload the first motor driving the transverse auger upon start-up. As the amount of grain in the upright auger decreases, the pressure signal will also decrease so as to cause the first motor to operate faster for increasing the amount of grain being fed into the upright auger. On the other hand, if the amount of grain in the upright auger increases, the pressure signal will also increase so as to cause the first motor to operate slower for decreasing the amount of grain being fed by the transverse auger to the upright auger.

The remaining patents, listed above but not specifically discussed, are deemed to be only of general interest and show the state of the art in combine harvesters for harvesting crops such as corn, wheat, soybeans, and the like which includes an unloading auger drive system for transferring grain into a storage compartment of a transport vehicle such as a truck.

None of the prior art discussed above disclosed a combine harvester for harvesting grain and seed crops like that of the present invention which includes a double unloading auger system for unloading in both directions of travel harvested feed grains produced in one round or two lengths of a field to storage area of transport vehicle.

SUMMARY OF THE INVENTION

Accordingly, it is a general object of the present invention to provide an improved combine harvester for harvesting grain and seed crops which is relatively simple and inexpensive in design, construction and operation.

It is an object of the present invention to provide an improved combine harvester for harvesting grain and seed crops on an efficient and cost effective basis.

It is another object of the present invention to provide a an improved combine harvester for harvesting grain and seed crops which includes a double unloading auger system for unloading in both directions of travel harvested feed grains produced in one round or two lengths of a field to storage area of transport vehicle.

It is still another object of the present invention to provide an improved combine harvester for harvesting grain and seed crops which includes a double unloading auger system so that if one unloading auger system is inoperative the combine can be continued operating at a reduced capacity until the inoperative auger system is repaired.

In a preferred embodiment of the present invention, there is provided a combine harvester for harvesting grain and seed crops which includes a grain tank for storing the harvested grain and a double unloading auger system operatively associated with said grain tank for selectively discharging in both directions of travel the harvested grain therefrom externally to either side of said combine harvester to a transport vehicle. The double unloading auger system consists of a first unloading auger assembly and a second unloading auger system. The first main unloading auger assembly is formed of a first vertical auger and a first horizontal auger being selectively operable for discharging the harvested grain from a first side of the combine harvester to the transport vehicle. The second main unloading auger assembly is formed of a first vertical auger and a first horizontal auger being selectively operable for discharging the harvested grain from a second side of the combine harvester to the transport vehicle.

A pair of transverse augers are located in a bottom wall of the grain tank and is selectively reversibly driven for delivery of the harvested grain from the grain tank to either the first main unloading auger assembly or the second main unloading auger assembly. As a result, if one of the first and second unloading auger assemblies is inoperative the combine harvester can be continued operating at a reduced capacity until the inoperative first or second unloading auger assembly is repaired.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

It is to be distinctly understood at the outset that the present invention shown in the drawings and described in detail in conjunction with the preferred embodiments is not intended to serve as a limitation upon the scope or teachings thereof, but is to be considered merely as an exemplification of the principles of the present invention.

Figure 1:
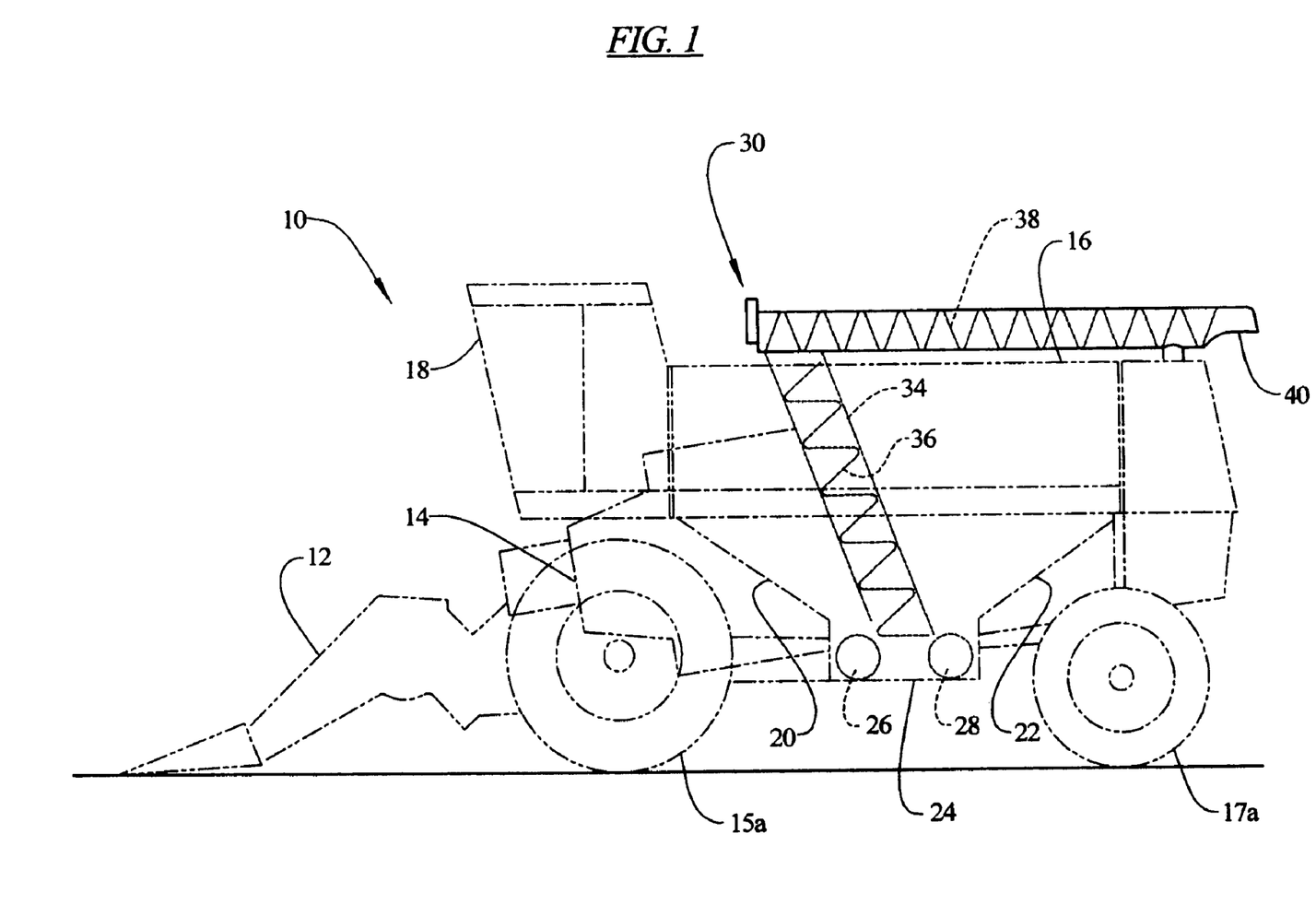
FIG. 1 is a left side elevational view of a combine harvester having a double unloading auger system, constructed in accordance with the principles of the present invention.
Figure 2:
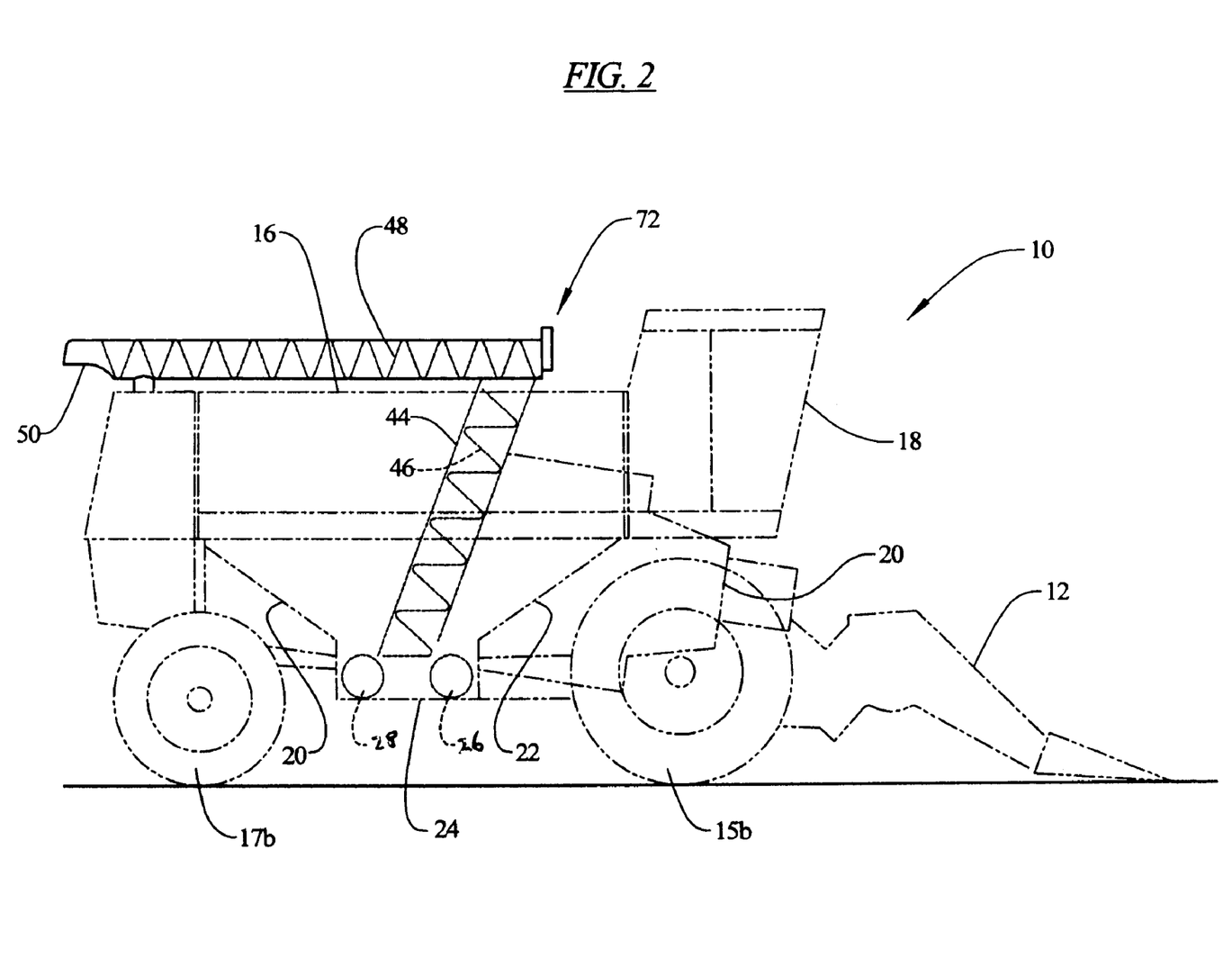
FIG. 2 is a right side elevational view of the combine harvester of FIG. 1.
Figure 3:
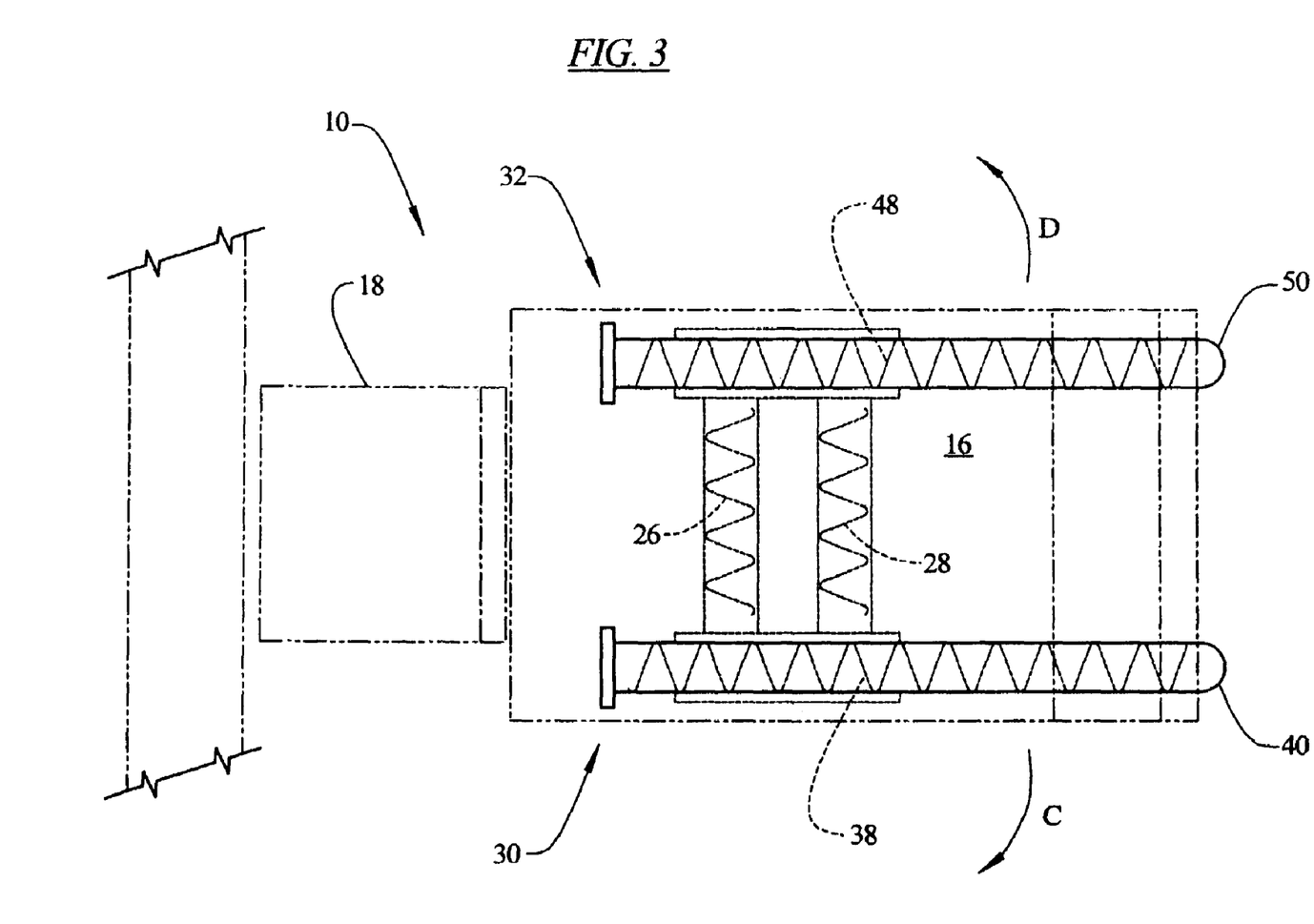
FIG. 3 is a top plan view of the combine harvester of FIG. 1.

Referring now in detail to the drawings, there is illustrated in FIG. 1 a left side elevational view of a self-propelled combine harvester 10 having a double unloading system for harvesting grain and seed crops, constructed in accordance with the principles of the present invention. The combine harvester is used for harvesting crops such as corn, wheat, soybeans and the like as well as corn pickers. FIG. 2 is a right side elevational view of the combine harvester 10 of FIG. 1. FIG. 3 is a top plan view of the combine harvester 10 of FIG. 1. The double unloading auger system consist of a first main unloading auger assembly 30 and a second main unloading auger assembly 32.

The combine harvester 10 includes a harvesting unit 12, such as a corn head, which is used to gather and deliver the grain to a grain processing unit 14. The combine harvester includes a pair of drivable wheels 15a, 15b and a pair of steerable wheels 17a, 17b. From the grain processing unit 14, the grain is delivered by means of a clean grain conveyor (not shown) to an on-board grain bin or tank 16. The grain tank 16 is typically positioned to be rearwardly, to the right as illustrated in FIG. 1, of a combine cab 18 in which an operator can be seated for controlling the overall harvesting operation. As described thus far, the combine harvester 10 is quite conventional of the modern day combines and includes all of the appurtenances and features that combine manufacturers typically provide.

The grain tank 16 includes a pair of inwardly sloping side wall 20 and 22 which converge downwardly towards a bottom wall 24. A pair of tranverse (horizontal) augers 26 and 28 are located in the bottom wall 24 of the grain tank 16 which are operable to deliver grain therefrom to either the first main unloading auger assembly 30 (FIG. 1) or the second main unloading auger assembly 32 (FIG. 2). The auger assembly 30 is pivotally attached to the left side of the combine harvester 10 so as to allow it to be swung outwardly at right angles therefrom in the direction of arrow C (FIG. 3) for unloading grain into a transport vehicle. Similarly, the auger assembly 32 is pivotally attached to the right side of the combine harvester so as to allow it to be swung outwardly at right angles therefrom in the direction of arrow D for unloading grain into the truck.

The first or left main auger unloading assembly 30 is formed of generally a L-shaped housing or chute 34. Disposed within the chute 34 are two co-operating augers; namely, a vertical auger 36 and a horizontal auger 38. The vertical auger 36 is suitably positioned in the grain tank 16 so as to receive grain from the transverse augers 26, 28 for delivery to the horizontal auger 38. The horizontal auger 38 then moves the grain therein and discharges it through a downwardly extending spout 40. Similarly, the second or right main auger unloading assembly 32 is formed of generally a L-shaped housing or chute 44. Disposed within the chute 44 are two co-operating augers; namely, a vertical auger 46 and a horizontal auger 48. The vertical auger 46 is suitably positioned in the grain tank 16 so as to receive grain from the transverse augers 26, 28 for delivery to the horizontal auger 48. The horizontal auger 48 then moves the grain therein and discharges it through a downwardly extending spout 50.

Figure 4:
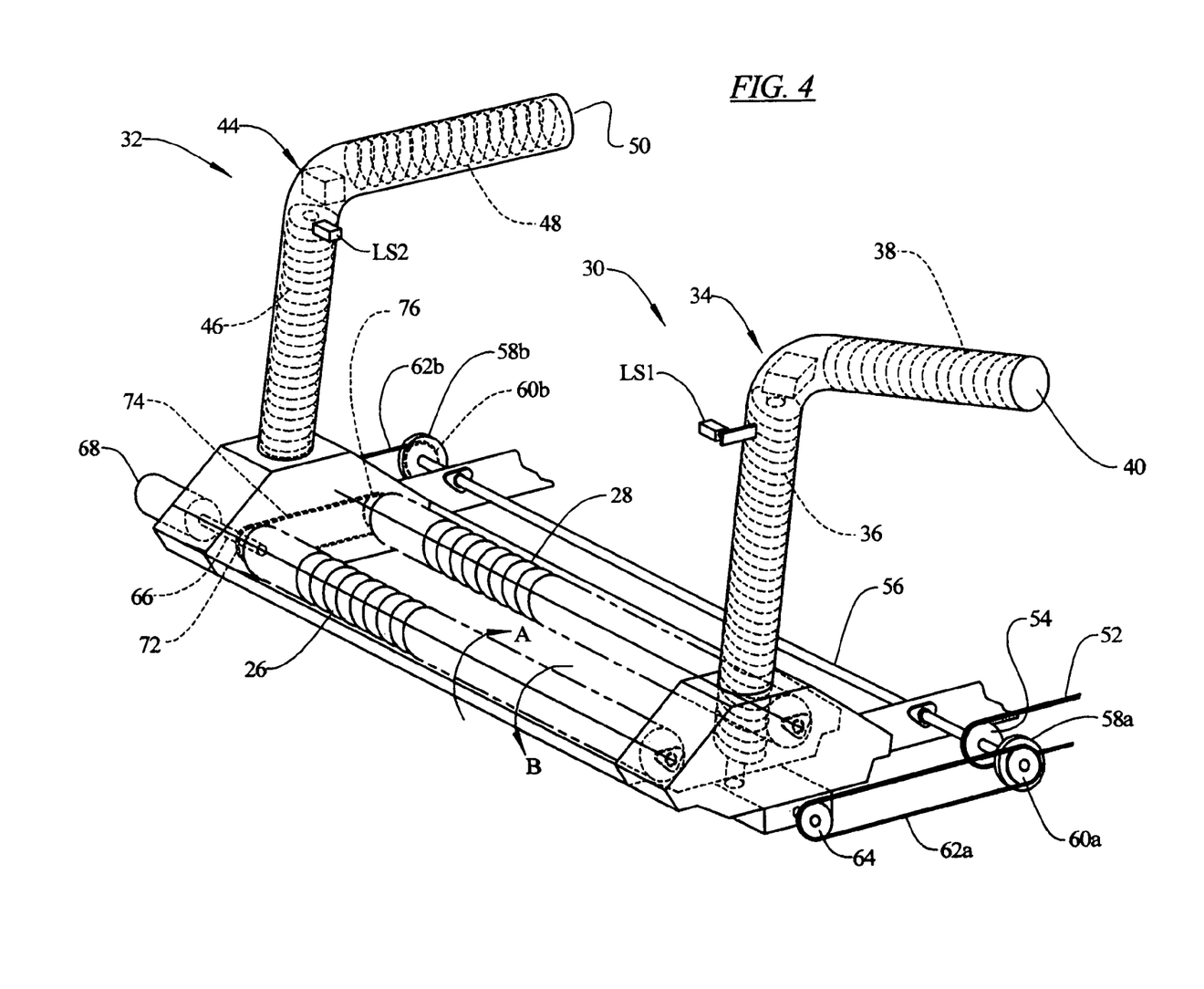
FIG. 4 is a prospective view of the drive system of the combine harvester of FIG. 1.

With reference now to FIG. 4, there is illustrated the drive system for the first main unloading auger assembly 30, the second main unloading auger assembly 32, and the transverse auger 26, 28. The first and second auger assemblies 30, 32 are driven mechanically and the transverse augers 26, 28 are driven hydraulically. In particular, the combine harvester 10 has a conventional power take-off shaft (not shown) connected through suitably sized gear sets, sprockets, chains, and bearings for driving a chain or belt 52 which, in turn, drives a sprocket 54 carried upon a jack-shaft 56. An electric clutch 58a and a drive sprocket 60a are also driven by the jack-shaft 56.

A chain 62a is carried on the sprocket 60a for driving a sprocket 64 which is suitably connected through gear sets, sprockets, chains and bearings for driving the augers 36, 38 in the first auger assembly 30. The jack-shaft 56 also drives an electric clutch 58b and a drive sprocket 60b. A sprocket 62b is carried on the sprocket 60b which, in turn in, is suitably connected by gear sets, sprockets, chains and bearings for driving the augers 46, 48 in the second auger assembly 32.

Unlike the auger assemblies 30 and 32, the transverse augers 26, 28 are driven by the output shaft 66 of a hydraulic reversible orbit motor 68 which receives hydraulic fluid under pressure from a hydraulic pump 70 by way of a hydraulic schematic diagram of FIG. 5, as will be more fully described hereinbelow. Specifically, the output shaft 66 carries a sprocket 72 which rotates the transverse auger 26. A chain or belt 74 is carried upon the sprocket 72 for driving a sprocket 76. The sprocket 76 is suitably connected for rotating the transverse auger 28. The orbit motor 68 is reversible so that the harvested grain in the tank can be transported to the first auger assembly 30 by rotating the transverse augers 26, 28 in a first or clockwise direction, as indicated by arrow A. On the other hand, the grain can be transported to the second auger assembly 32 by rotating the transverse augers in a second or counter-clockwise direction, as indicated by arrow B.

Figure 5:
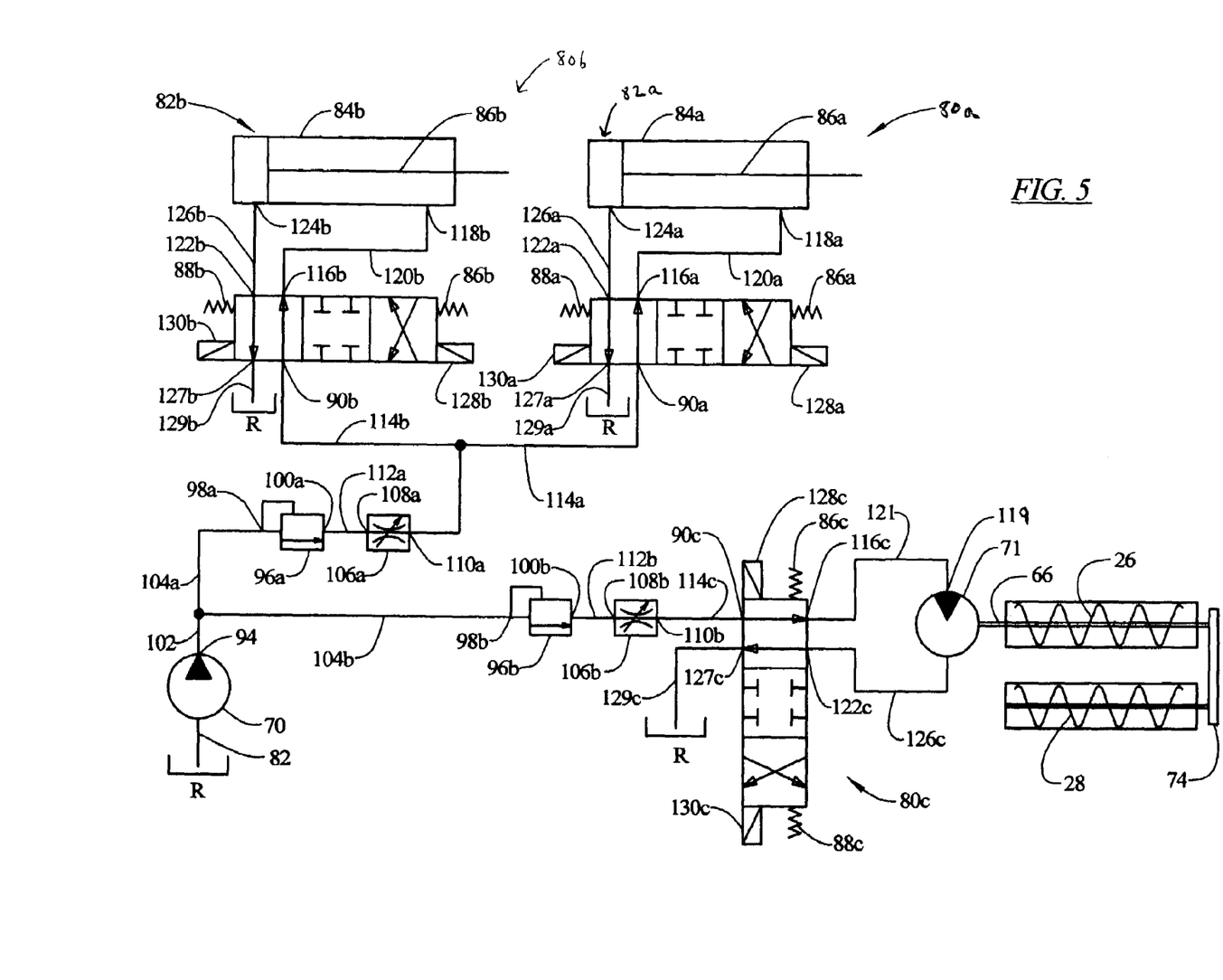
FIG. 5 is a hydraulic schematic diagram of the drive system of FIG. 4.

As is depicted in FIG. 5, there is shown a hydraulic schematic diagram which is utilized in conjunction with the hydraulic pump 70 for operating the drive system of FIG. 4. A three-position, two-way solenoid-operated valve 80a is interposed between the hydraulic pump 70 and a hydraulic cylinder assembly 82a. The hydraulic cylinder assembly 82a consists of a cylinder 84a and piston rod 86a disposed within the cylinder 82a. The valve 80a has a first or top position, second or centered position, and a third or bottom position, as illustrated in FIG. 5. The valve 80a is biased by opposed springs 86a, 88a to be normally blocked port or spring centered position. In this position, there is no pressurized fluid entering the first inlet 90a of the valve 80a for operating the hydraulic cylinder assembly 82a.

The hydraulic pump 70 has an inlet 92 connected to a system tank or reservoir R and an outlet 94. A pressure regulator valve 96a for adjusting and/or setting the pressurized fluid has an inlet 98a and outlet 100a. The inlet 98a of the regulator valve 96a is connected to the pump outlet 94 via conduits 102a, 104a. A flow control valve device 106a for controlling the flow rate or speed of the pressurized fluid has an inlet 108a and an outlet 110a. The outlet 100a of the regulator valve 96a is connected to the inlet 108a of the flow control device 106a via conduit 112a.

In the bottom position as illustrated, the valve 80a has its first inlet 90a connected to the outlet 110 of the flow control device 106 via a conduit 114a. The valve 80a has its first outlet 116a connected to the rod side at port 118a of the hydraulic cylinder assembly 82a via conduit 120a and has its second inlet 122a connected to the piston side at port 124a via conduit 126a. The valve 80a has a second outlet 127a which is connected to the reservoir R via conduit 129a. The valve 80a further has a first solenoid operator 128a and a second solenoid operator 130a.

When it is desired to pivotally move the first auger assembly 30 in the direction of the arrow C (FIG. 3) to the unloading position, the vehicle operator energizes the first solenoid operator 128a so as to move the valve 80a to the top position. In this top position, the pressurized fluid from the pump 70 will flow through the pressure regulator 96a, flow control device 106a, and the conduit 114a into the first inlet 90a and out the second inlet 122a. As a result, the pressurized fluid will entered the port 124a of the assembly 82a for moving the piston rod 86a outward to its extended position. This causes the first auger assembly 30 to pivot or rotate to a position substantially perpendicular to the one shown in FIG. 3. The fluid exits the port 118a and is returned to the reservoir R.

When it is desired to pivotally move the first auger assembly 30 back to its original position, the vehicle operator energizes the second solenoid operator 130a so as to move the valve 80a to the bottom position as depicted. In this bottom position, the pressurized fluid from the pump 70 will flow through the pressure regulator 96a, flow control device 106a, and the conduit 114a into the first inlet 90a and out the first outlet 116a. As a result, the pressurized fluid will entered the port 118a of the assembly 82a for moving the piston rod 86a inward to its retracted position. This causes the first auger assembly 30 to pivot or rotate to the position shown in FIG. 3. The fluid exits the port 124a and is returned to the reservoir R.

Similarly, a second three-position, two-way solenoid-operated valve 80b is interposed between the hydraulic pump 70 and a hydraulic cylinder assembly 82b. The hydraulic cylinder assembly 82b consists of a cylinder 84b and piston rod 86b disposed within the cylinder 82b. The valve 80b has a first or top position, second or centered position, and a third or bottom position, as illustrated in FIG. 5. The valve 80b is biased by opposed springs 86b, 88b to be normally blocked port or spring centered position. In this position, there is no pressurized fluid entering the first inlet 90b of the valve 80b for operating the hydraulic cylinder assembly 82b.

In the bottom position as illustrated, the valve 80b has its first inlet 90b also connected to the outlet 110 of the flow control device 106 via a conduit 114b. The valve 80b has its first outlet 116b connected to the rod side at port 118b of the hydraulic cylinder assembly 82b via conduit 120b and has its second inlet 122b connected to the piston side at port 124b via conduit 126b. The valve 80b has a second outlet 127b which is connected to the reservoir R via conduit 129b. The valve 80a further has a first solenoid operator 128b and a second solenoid operator 130b.

When it is desired to pivotally move the second auger assembly 32 in the direction of the arrow D (FIG. 3) to the unloading position, the vehicle operator energizes the first solenoid operator 128b so as to move the valve 80b to the top position. In this top position, the pressurized fluid from the pump 70 will flow through the pressure regulator 96, flow control device 106, and the conduit 114b into the first inlet 90b and out the second inlet 122b. As a result, the pressurized fluid will entered the port 124b of the assembly 82b for moving the piston rod 86b outward to its extended position. This causes the first auger assembly 32 to pivot or rotate to a position substantially perpendicular to the one shown in FIG. 3. The fluid exits the port 118b and is returned to the reservoir R.

When it is desired to pivotally move the second auger assembly 32 back to its original position, the vehicle operator energizes the second solenoid operator 130b so as to move the valve 80b to the bottom position as depicted. In this bottom position, the pressurized fluid from the pump 70 will flow through the pressure regulator 96, flow control device 106, and the conduit 114b into the first inlet 90b and out the first outlet 116b. As a result, the pressurized fluid will entered the port 118b of the assembly 82b for moving the piston rod 86b inward to its retracted position. This causes the second auger assembly 32 to pivot or rotate to the position shown in FIG. 3. The fluid exits the port 124b and is returned to the reservoir R.

Further, a third three-position, two-way solenoid-operated valve 80c is interposed between the hydraulic pump 70 and the traverse augers 26 and 28. The valve 80c has a first or top position, second or centered position, and a third or bottom position, as illustrated in FIG. 5. The valve 80c is biased by opposed springs 86c, 88c to be normally blocked port or spring centered position. In this position, there is no pressurized fluid entering the first inlet 90c of the valve 80c for operating the transverse augers 26 and 28.

A pressure regulator valve 96b for adjusting and/or setting the pressurized fluid has an inlet 98b and outlet 100b. The inlet 98b of the regulator valve 96b is also connected to the pump outlet 94 via conduits 102b, 104b. A flow control device 106b for controlling the flow rate or speed of the pressurized fluid has an inlet 108b and an outlet 100b. The outlet 100b of the regulator valve 96b is connected to the inlet 108b of the flow control device 106b via conduit 112b.

In the top position as illustrated, the third valve 80c has its inlet 90c connected to the outlet 110b of the flow control device 106b via a conduit 114c. The valve 80c has its first outlet 116c connected to a fluid inlet port 119 of a hydraulic motor 71 via a conduit 121 and has its second inlet 122c connect to the fluid outlet port 125 of the motor 71 via a conduit 126c. The valve 80c has a second outlet 127c connected to the reservoir R via a conduit 129c. When it is desired to transfer the grain in the tank to the first auger assembly 30, the vehicle operator energizes the first solenoid operator 128a. In this top position, pressurized fluid from the pump 70 will flow through the pressure regulator 96b, flow control device 106b, and the conduit 114c and into the inlet 90c, through the motor 71 and out the outlet 127c into the reservoir R. As a result, the motor 71 will rotate the shaft 66 in the counter-clockwise direction of arrow A (FIG. 4) so as to cause the harvested grain to be moved to the first auger assembly 30.

On the other hand, when it is desired to transfer the grain in the tank to the second auger assembly 32, the vehicle operator energizes the second solenoid operator 128a. In this bottom position, pressurized fluid from the pump 70 will flow through the pressure regulator 96b, flow control device 106b, and the conduit 114c and into the inlet 90c, through the motor 71 and out the outlet 127c into the reservoir R. As a result, the motor 71 will rotate reversely the shaft 66 in the clockwise direction of arrow B (FIG. 4) so as to cause the harvested grain to be moved to the second auger assembly 32.

The control valves 80a–80c are directional control valves which may be similar to those commercially available from the Valve Division of Parker Hannifin Corporation of Elyria, Ohio 44035. It will noted that a first limit switch LS1 (FIG. 4) is provided for operation with the chute 34 mounted on the left side of the combine and a second limit switch LS2 is provided for operation with the chute 44 mounted on the right side thereof. When the chute 34 is moved pivotally by the hydraulic cylinder assembly 82a to the unloading position, a portion of the chute 34 will contactly engage with the limit switch LS1 so as to engage the electric clutch 58a to drive the sprocket 60a, chain 62a and sprocket 64a. As a consequence, the vertical and horizontal augers 36, 38 are inoperative until the time that the limit switch LS1 is closed and will then only begin to rotate for delivering the grain out the port 40 into the truck located in the left side of the combine harvester. Similarly, When the chute 44 is moved pivotally by the hydraulic cylinder assembly 82b to the unloading position, a portion of the chute 44 will contactly engage with the limit switch LS2 so as to engage the electric clutch 58b to drive the sprocket 60a and chain 62a. As a consequence, the vertical and horizontal augers 46, 48 are inoperative until the time that the limit switch LS2 is closed and will then only begin to rotate for delivering the grain out the port 50 into the truck located in the right side of the combine harvester.

From the foregoing detailed description, it can thus be seen that the present invention provides combine harvester for harvesting grain and seed crops which includes a double unloading auger system for unloading in both directions of travel harvested feed grains produced in one round or two lengths of a field to storage area of transport vehicle. As a result, if one unloading auger system is inoperative the combine can be continued operating at a reduced capacity until the inoperative auger system is repaired.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

The invention claimed is:

1. A combine harvester for harvesting grain and seed crops which includes a grain tank for storing the harvested grain and a double unloading auger system operatively associated with said grain tank for selectively discharging in both directions of travel the harvested grain therefrom externally to either side of said combine harvester to a transport vehicle, said double unloading auger system comprising:
    a first main unloading auger assembly including a first vertical auger and a first horizontal auger being selectively operable for discharging the harvested grain from a first side of said combine harvester to the transport vehicle;
    a second main unloading auger assembly including a second vertical auger and a second horizontal auger being selectively operable for discharging the harvested grain from a second side of said combine harvester to the transport vehicle; and
    a pair of transverse auger located in a bottom wall of said grain tank and being selectively reversibly driven for delivery of the harvested grain from said grain tank to either said first main unloading auger assembly or said second main unloading auger assembly.

2. A combine harvester for harvesting grain and seed crops as claimed in claim 1, further comprising means for driving mechanically said first and second main unloading auger assemblies and means for driving hydraulically said pair of transverse augers.

3. A combine harvester for harvesting grain and seed crops as claimed in claim 1, further comprising first control valve means including a first hydraulic cylinder assembly for selectively moving said first main unloading auger assembly between a first position and a second position for discharging the harvested grain from the first side of said combine harvester.

4. A combine harvester for harvesting grain and seed crops as claimed in claim 3, further comprising second control valve means including a second hydraulic cylinder assembly for selectively moving said second main unloading auger assembly between a first position and a second position for discharging the harvested grain from the second side of said combine harvester.

5. A combine harvester for harvesting grain and seed crops as claimed in claim 3, said first control valve means includes a valve member biased towards a centered blocked port position preventing flow of pressurized fluid to said first hydraulic cylinder assembly.

6. A combine harvester for harvesting grain and seed crops as claimed in claim 5, wherein said first control valve means includes first energizing means for moving said valve member towards a top position permitting flow of pressurized fluid to said first hydraulic cylinder assembly so as to cause said first main unloading auger assembly to be moved to said second position.

7. A combine harvester for harvesting grain and seed crops as claimed in claim 6, wherein said first control valve means includes second energizing means for moving said valve member towards a bottom position permitting flow of pressurized fluid to said first hydraulic cylinder assembly so as to cause said first main unloading auger assembly to be moved back to said first position.

8. A combine harvester for harvesting grain and seed crops as claimed in claim 4, wherein said second control valve means includes a valve member biased towards a centered blocked port position preventing flow of pressurized fluid to said second hydraulic cylinder assembly.

9. A combine harvester for harvesting grain and seed crops as claimed in claim 8, wherein said second control valve means includes first energizing means for moving said valve member towards a top position permitting flow of pressurized fluid to said second hydraulic cylinder assembly so as to cause said second main unloading auger assembly to be moved to said second position.

10. A combine harvester for harvesting grain and seed crops as claimed in claim 9, wherein said second control valve means includes second energizing means for moving said valve member towards a bottom position permitting flow of pressurized fluid to said second hydraulic cylinder assembly so as to cause said second main unloading auger assembly to be moved back to said first position.

11. A combine harvester for harvesting grain and seed crops as claimed in claim 2, wherein said means for driving hydraulically said transverse augers includes a third control valve means having a reversible hydraulic motor for selectively rotating said transverse augers either in a counter-clockwise direction to move the harvested grain to said first main unloading auger assembly or in a clockwise direction to move the harvested grain to said second main unloading auger assembly.

12. A combine harvester for harvesting grain and seed crops as claimed in claim 11, wherein said third control valve means includes a valve member biased towards a centered blocked port position preventing flow of pressurized fluid to said hydraulic motor.

13. A combine harvester for harvesting grain and seed crops as claimed in claim 12, wherein said third control valve means includes first energizing means for moving said valve member towards a top position permitting flow of pressurized fluid to said hydraulic motor so as to cause said transverse augers to be rotated in the counter-clockwise direction.

14. A combine harvester for harvesting grain and seed crops as claimed in claim 13, wherein said third control valve means includes second energizing means for moving said valve member towards a bottom position permitting flow of pressurized fluid to said hydraulic motor so as to cause said transverse augers to be rotated in the clockwise direction.

15. A combine harvester for harvesting grain and seed crops which includes a grain tank for storing the harvested grain and a double unloading auger system operatively associated with said grain tank for selectively discharging in both directions of travel the harvested grain therefrom externally to either side of said combine harvester to a transport vehicle, said double unloading auger system comprising:
    first main unloading auger means including a first vertical auger and a first horizontal auger being selectively operable for discharging the harvested grain from a first side of said combine harvester to the transport vehicle;
    second main unloading auger means including a second vertical auger and a second horizontal auger being selectively operable for discharging the harvested grain from a second side of said combine harvester to the transport vehicle; and
    transverse auger means located in a bottom wall of said grain tank and being selectively reversibly driven for delivery of the harvested grain from said grain tank to either said first main unloading auger means or said second main unloading auger means.

16. A combine harvester for harvesting grain and seed crops as claimed in claim 15, further comprising means for driving mechanically said first and second main unloading auger means and means for driving hydraulically said transverse auger means.

17. A combine harvester for harvesting grain and seed crops as claimed in claim 15, further comprising a first control valve means including a first hydraulic cylinder assembly for selectively moving said first main unloading auger means between a first position and a second position for discharging the harvested grain from the first side of said combine harvester.

18. A combine harvester for harvesting grain and seed crops as claimed in claim 17, further comprising a second control valve means including a second hydraulic cylinder assembly for selectively moving said second main unloading auger means between a first position and a second position for discharging the harvested grain from the second side of said combine harvester.

19. A combine harvester for harvesting grain and seed crops as claimed in claim 16, wherein said means for driving hydraulically said transverse augers means includes a third control valve means having a reversible hydraulic motor for selectively rotating said transverse augers means either in a counter-clockwise direction to move the harvested grain to said first main unloading auger means or in a clockwise direction to move the harvested grain to said second main unloading auger means.

\* \* \* \* \*